(12) United States Patent
Carteri et al.

(10) Patent No.: US 10,972,420 B2
(45) Date of Patent: Apr. 6, 2021

(54) AUTOMATIC NOTIFICATION GENERATION FOR ELECTRONIC PROCESSING SYSTEMS

(71) Applicant: International Business Machines Corporation, Armonk, NY (US)

(72) Inventors: Francesco Maria Carteri, Rome (IT); Ivonne Elizabeth Vereau Tolino, Rome (IT); Antonio Castellucci, Rome (IT); Michele Antonio Emilio Maria Licursi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 105 days.

(21) Appl. No.: 16/179,306

(22) Filed: Nov. 2, 2018

(65) Prior Publication Data

US 2020/0145363 A1    May 7, 2020

(51) Int. Cl.
*H04L 12/58* (2006.01)
*G06F 40/20* (2020.01)

(52) U.S. Cl.
CPC .............. *H04L 51/26* (2013.01); *G06F 40/20* (2020.01); *H04L 51/16* (2013.01); *H04L 51/24* (2013.01); *H04L 51/32* (2013.01)

(58) Field of Classification Search
CPC ......... H04L 51/26; H04L 51/16; H04L 51/24; H04L 51/32; G06F 40/20
See application file for complete search history.

(56) References Cited

U.S. PATENT DOCUMENTS

| 9,485,212 | B1* | 11/2016 | Bastide | ................... H04L 51/32 |
| 2006/0101126 | A1* | 5/2006 | Huang | ................... H04L 51/26 |
| | | | | 709/207 |
| 2007/0168430 | A1 | 7/2007 | Brun et al. | |
| 2007/0294199 | A1 | 12/2007 | Nelken et al. | |
| 2009/0100141 | A1 | 4/2009 | Kirkland et al. | |

(Continued)

OTHER PUBLICATIONS

Anonymous, "Interests view for unread messages based on cognitive computing and emotion detection," an IP.com Prior Art Database Technical Disclosure, IP.com No. IPCOM000248900D, https://priorart.ip.com/IPCOM/000248900, electronic publication date Jan. 20, 2018, 8 pgs.

(Continued)

*Primary Examiner* — June Y Sison
(74) *Attorney, Agent, or Firm* — Jared L. Montanaro (57) ABSTRACT

A processor may receive a delivered message. The processor, using natural language processing, may identify content of the delivered message. The processor may generate a first importance score for the delivered message based on the content of the delivered message. The processor may send a notification to at least one recipient of the delivered message as a reminder of the delivered message, in response to the first importance score fulfilling a predefined delivery condition. In some embodiments, a processor may receive a message. The processor may identify the content of the message using natural language processing. The processor may generate a first importance score for the message based on the content of the message. The processor may determine that a second message received is related to the message. The processor may update the first importance score.

19 Claims, 5 Drawing Sheets

(56) References Cited

U.S. PATENT DOCUMENTS

| | | |
|---|---|---|
| 2009/0172103 A1 | 7/2009 | Tuli |
| 2013/0041968 A1 | 2/2013 | Cohen et al. |
| 2017/0034103 A1 | 2/2017 | Karuppasamy |
| 2017/0118159 A1* | 4/2017 | Ratiu .................... H04L 51/32 |
| 2018/0217968 A1* | 8/2018 | Bastide .................. G06F 40/30 |

OTHER PUBLICATIONS

Anonymous, "Instant messaging notification system using NLP methods," An IP.com Prior Art Database Technical Disclosure, IP.com No. IPCOM000252621D, https://priorart.ip.com/IPCOM/000252621, electronic publication date Jan. 30, 2018, 2 pgs.

Mell et al., "The NIST Definition of Cloud Computing," Recommendations of the National Institute of Standards and Technology, U.S. Department of Commerce, Special Publication 800-145, Sep. 2011, 7 pgs.

\* cited by examiner

AUTOMATIC NOTIFICATION GENERATION FOR ELECTRONIC PROCESSING SYSTEMS

BACKGROUND

The present disclosure relates to the field of digital computer systems, and more specifically, to a method of processing delivered electronic messages.

Group discussions on social networks involve a large number of delivered messages. Some messages are of a general purpose and are not directed to a specific person, but some messages can be directed to specific persons. Conversation texts or posts of a discussion may require, only for certain parts of the discussion, a response or action from a specific person. However, due to the large number of delivered messages that are exchanged over the network some messages or parts of discussions may be overlooked or not processed.

SUMMARY

Embodiments of the present disclosure disclose a method, system, and computer program product for determining when to send a reminder notification to a specific user. A processor may receive a delivered message. The processor, using natural language processing, may identify content of the delivered message. The processor may generate a first importance score for the delivered message based on the content of the delivered message. The processor may send a notification to at least one recipient of the delivered message as a reminder of the delivered message, in response to the first importance score fulfilling a predefined delivery condition.

In some embodiments, a processor may receive a message. The processor may identify the content of the message using natural language processing. The processor may generate a first importance score for the message based on the content of the message. The processor may determine that a second message received is related to the message. The processor may update the first importance score.

BRIEF DESCRIPTION OF THE DRAWINGS

In the following embodiments of the disclosure are explained in greater detail, by way of example only, making reference to the drawings in which.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of digital computer systems, and more specifically, to a method of processing delivered electronic messages. While the present disclosure is not necessarily limited to such applications, various aspects of the disclosure may be appreciated through a discussion of various examples using this context.

Various embodiments provide a method of processing delivered electronic messages, a system for calculating an importance score of a message submitted to an electronic messaging system, and a computer program product as described by the subject matter of the independent claims. Advantageous embodiments are described in the dependent claims. Embodiments of the present disclosure can be freely combined with each other if they are not mutually exclusive.

In some embodiments, the disclosure relates to a computer implemented method of processing delivered electronic messages. The method comprises: applying a natural language processing algorithm on content of a delivered message to obtain at least one importance score; and in case the importance score fulfills a predefined delivery condition, sending a notification to at least one recipient of the delivered message as a reminder of the delivered message.

In some embodiments, the disclosure relates to a computer implemented method for calculating an importance score of a message submitted to an electronic messaging system. The method comprises: applying a natural language processing algorithm on content of the message to obtain the importance score; and upon appearance of a further (e.g., second, third, subsequent, etc.) message submitted to the messaging system, determining if the further delivered message is related to the message and, if so, updating the importance score based on applying the natural language processing algorithm to the further delivered message.

In some embodiments, the disclosure relates to a computer program product comprising a computer-readable storage medium having computer-readable program code embodied therewith, the computer-readable program code configured to implement all of steps of the disclosed method (s) according to preceding embodiments.

In some embodiments, the disclosure relates to a computer system for processing delivered electronic messages. The computer system is configured for: applying a natural language processing algorithm on content of a delivered message to obtain at least one importance score; and in case the importance score fulfills a predefined delivery condition, sending a notification to at least one recipient of the delivered message as a reminder of the delivered message.

Further, the present disclosure relates to a method of processing delivered electronic messages. The method comprises: applying a natural language processing algorithm on content of a delivered message to obtain at least one importance score. In case the importance score fulfills a predefined delivery condition, a notification may be sent to at least one recipient of the delivered message as a reminder of the delivered message.

The descriptions of the various embodiments of the present disclosure will be presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

For example, the message may be delivered to multiple users. The importance score may be determined for each of the multiple users (e.g., personalized importance scores may be determined for each user), which are also referred to as the recipients of the message. Additionally, the notification is delivered to each of the users if the respective importance score of the user fulfils the delivery condition (e.g., if the user is directly named in a subsequent message, there is a time limit indicated in a message, etc.). In another example, the multiple users may be split into subgroups, and the importance score may be determined for each subgroup of users (e.g., a personalized importance score may be determined for each subgroup). The notification is delivered to each subgroup of users if the respective importance score of the subgroup fulfills the delivery condition. The splitting may, for example, be performed based on a characteristic of the users such as a location or age of the users.

The delivered message may, for example, be an email submitted to one or more recipients or a post of a social media website that is provided to, posted on, or delivered to multiple users (e.g., a group message, mass email, etc.). In one example, the delivered message may be part of a sequence of messages (e.g. conversations, threads, etc.), such as, a sequence of messages of a chat session. The delivered message may be the first of the sequence or any other message of the sequence. The delivered messages may be received at an electronic messaging system. In one example, the delivered messages may be received at the electronic messaging system before being dispatched to other systems where the users or recipients can access them (e.g., the delivered message may be processed through a central server before being distributed to the [one or more] users). In another example, the delivered messages may be received at the electronic messaging system and the users or recipients may access them at the electronic messaging system, e.g., via an interface such as a web-interface.

The present method and system may enable an artificial intelligence/machine-learning system to build notification messages based on the understanding and analysis of delivered messages. This may be based on elements extracted from the messages, e.g., of a conversation, in order to build (e.g., generate, compose, etc.) the notifications. Each notification that is going to be triggered may be associated to an importance score indicative of a confidence for delivering the notification. The confidence may indicate the probability that the notification itself is useful and appropriate to the context of the delivered message. The system identifies the notifications that could be potentially delivered because the user could be interested in/impacted by them, e.g., the identified notifications have the highest importance score as the importance score personally relates to user. The system can be customized to deliver the notification only when a confidence factor threshold is reached.

The present method may enable a notification method that is optimized for individual recipients based on a cognitive analysis of message contents. For example, for each chat group, email thread, etc., every recipient can have a different score indicating whether a response from that user is needed, e.g., a user can have a higher score, while another user can have a lower or zero score on the same discussion. An example advantage of the scoring may be that a user returning from his lunch or after an inactive period, like a vacation week, can avoid reading past discussions that have been already flagged with a low score and for which the user may have not received a respective notification. This scoring method can be applied to messaging tools such as an instant messaging, email systems, etc.

For example, the computer system may be a cognitive system that may be configured to process conversations to understand the conversation's importance and which recipients the conversations are directed to. The cognitive system can analyze the conversations texts and identify all the sentences that are directed to a user. The system may check if the user has already read, or not read, a message (e.g., of a conversation) and may notify him according to the importance of the message.

In some embodiments, the method further comprises if a further (e.g., second delivered, subsequent, etc.) message is submitted to the recipient, determining if the further delivered message is related to the delivered message and, if so, updating the importance score based on applying the natural language processing algorithm to the further delivered message, and repeating the notification step using the updated importance score. In another example, the notification step is performed after the reception of at least one further delivered message destined to the recipient and after updating the importance score at least one time. This embodiment may be advantageous as it may provide an accurate notification logic that is based on a flow of messages. This may particularly be advantageous in case of thousand messages that are shared between or sent to multiple recipients but only one specific message may need attention of a specific recipient.

For example, the following chat may be delivered in multiple messages to multiple recipients:
Frank: "Hey guys, what do you think of meeting tomorrow for lunch?"
John: "yes for me, that's fine"
Marc: "yes, let's do lunch at noon"
Paul: "yes, we can meet tomorrow, but better in late-afternoon, what do you think?"
Jim: "yes, ok with me, let's do 3 p.m., ok?"
Frank: "ok with me"
John: "ok"
Paul: "ok"
Marc: "ok"

For example, the delivered message "Hey guys, what do you think of meeting tomorrow for lunch?" indicates that the recipients (e.g., John, Marc, and Paul) need to respond. The chat indicates that a number of participants have provided their response but, for example, one or more recipients have not yet responded. An importance score may be defined based on the result of a natural language processing of the text of the message. The further delivered message "yes, ok with me, let's do 3 p.m., ok?" may affect the importance score (and thus the notification) as it indicates a specific time constraint which is different from the time indicated in the first delivered message. This may induce a change in the importance score. The method may decide to notify the recipients that have not responded based on the notification score and/or on the updated notification score.

In another example, the method may decide to deliver the notification based on the updated notification score, e.g., the method may determine that the notification score is updated N times because of N further delivered messages and may decide to use the resulting updated importance score to notify, or not notify, the recipient(s) that have not responded yet. For example, based on the delivered messages, the remaining recipients may be notified using a question that is deducted, or generated, from the delivered messages: "Do you want to meet tomorrow afternoon with your mates at 3 p.m.?". For example, a cognitive filter may be used by the system for the delivery of the notifications. The filter may be configured so as to minimize the number of notifications, e.g., by setting the maximum notification occurrence for the same event (e.g., same chat session, thread, etc.) and the same user.

In another example, e.g., of another chat session, a first delivered message may comprise a negative sentiment (e.g., a connotative statement), and which becomes positive in a further delivered message, e.g., because the problem could be resolved. The first delivered message may be scored by an importance score. The importance score may be updated by the further delivered message. This may result in the score being reduced because the sentiment has changed to a positive sentiment indicating that a problem has been resolved and requires little or no-more attention by recipients. The notification may be performed based on the importance score and/or updated importance score. For example, the notification may not be needed as the updated score may not exceed the predefined threshold (e.g., the message does not include a temporal statement that indicates that immediate attention is required to resolve the issue). Otherwise, when the status of the sentiment persists to be negative in both messages, a notification may be necessary. A change in the sentiment of delivered messages is exemplified as follows.

For example, the first delivered and further delivered messages may comprise the following texts:

Jim: "I've been struggling with this system issue for two days . . . . Can you help with this problem?" . . . .

Jim: "Never mind, Marc has given me an excellent solution!"

The two first sentences may belong to the first delivered message and the last sentence may belong to the further delivered message which is delivered later in time after the first delivered message. The first and second delivered messages have different sentiments, with the first delivered message having a negative sentiment/connotation indicating a problem that should be resolved, and the second delivered message having a positive sentiment/connotation indicating that a problem has been resolved. The notification, if based on the updated score, may not be delivered as the problem is solved in the second message.

In some embodiments, determining if the further delivered message is related to the message comprises checking metadata of the message and the further delivered message, the metadata indicating whether or not the message and the further delivered message belong to either a specific thread of messages, a topic, a group of users, a specific user, or a specific multi-user chat session. The message and the further delivered message may belong to, or destined to, a same specific user and may be part of different respective chat sessions or of different threads.

In some embodiments, the notification is performed if the recipient does not respond to the message. For example, the delivery condition may require that the importance score is higher than a predefined threshold and may further require that the recipient did not respond to the message. This may save processing resources for performing unnecessary notifications. The system may, for example, determine that the user did not answer, e.g., by combining acknowledgements and context analysis as follows. The system may be configured to receive a notification of acknowledgement of the delivered message. An analysis of the incoming feedback with a context analysis and the natural language processing may be performed to determine if the message was properly answered. For example, if the message comprises: "Would you meet tomorrow," a simple acknowledgement (e.g. such as an icon indicating that the message has been read/received/etc.) is not enough to decide whether the user has answered, while answers received at the electronic messaging system like "I would prefer Saturday" or "Tomorrow I have to travel," are valid answers.

In some embodiments, the obtaining of the importance score comprises: evaluating predefined message parameters; scoring each of the evaluated parameters; and combining the scores for determining the importance score. The evaluation of the parameters may be performed by the natural language processing (NLP) algorithm. The NLP algorithm may comprise the Watson Natural Language Understanding service that can be leveraged to extract sentences and may be enhanced to extract new elements to build the notifications. The message parameter may be descriptive of the content of the message. For example, the message parameter may be a time indication that may be deduced by the NLP algorithm from the content of the message, or a name of a person that is cited in the message or a person to whom the message is directed. For example, for each parameter, a map may be provided that maps the values of the parameter to the associated score. The scores may, for example, be user defined. In another example, a predefined scoring scheme such as a function may be used to provide scores based on the parameter values. The combination of the scores may, for example, comprise the sum of the scores.

In some embodiments, the method further comprises providing multiple scoring schemes (e.g., models), wherein the scoring comprises selecting a scoring scheme from the multiple scoring schemes based on the time of applying the natural language processing algorithm (e.g., the time at which the natural language processing algorithm is applied, and/or how long it takes for the natural language processing algorithm to complete processing of a delivered message), and applying the selected scoring scheme for the scoring.

The importance of messages may change over time, and thus by using time dependent scoring schemes the importance score may be accurately determined and may scale with time. For example, a first message with the user tagged explicitly: "@user do you want to join the party?" or a first message, such as: "We have to decide where we want to go this holiday season and book the trip," could become less important later than a second message that is flagged with a temporal importance, such as: "See you in 10 minutes." The first and second messages may, for example, belong to two different contexts or chats. In some embodiments, in response to the first and second messages belonging to different chats, the second message may be generated a notification and/or displayed to the user before the user opens an application associated with the messages. The second message indicates that the parts are going to meet in person in 10 minutes, so any further talk on simple or colloquial arguments may be postponed, so the message importance score of the first message may be lowered, as it seems not urgent to answer because the discussion may happen later in person.

For example, a scoring scheme may require the combination of time and sentiment related parameters. Another scoring scheme may use only the time related parameter. Following the above example if (case 1) the "10 min" message is already provided, at the time of processing the first message, the selected scoring scheme may be the one that combines both the time and sentiment (or other parameters). This may result in scoring the first message lower than the second message as the time for response of the second message is only 10 mins. If (case 2) at the time of processing the first message the "10 min" message is not present, the selected scoring scheme may be the one that is based on whether the user must respond, or not respond, regardless of the response time. The score of the first message in case 2 may be higher than the score of the first message in case 1 as the score of the first message in case 1 may be lowered because of the presence of the second message.

In some embodiments, the message parameter comprises a time period required for a response to the message, an indication if the recipient is addressed by the message or not, and/or an indication of a positive or negative statement in the message. The more parameters provided the more accurate the scoring and the notification. A positive or negative statement may indicate a positive or negative sentiment respectively.

In some embodiments, the predefined delivery condition includes: a condition that the importance score is updated at least once; and/or a condition that the importance score is higher than a predefined threshold. The importance score may be updated upon receiving a further delivered message that relates to the delivered message and if a further importance score of the further delivered message is determined, the importance score of the delivered message may be updated with the value of the further importance score. In other terms, the notification can be performed if more than one message is processed, e.g., such that the importance score is updated for each N further delivered message and the importance score is updated N predefined times. In one example, the notification can be performed if the importance score is updated N times and the resulting updated importance score is higher than the predefined threshold. This embodiment may enable a controlled and accurate notification method.

In some embodiments, the message is delivered to multiple (e.g., two or more) users including the recipient, wherein the importance score is user-dependent. For example, the importance score may be determined for each user of the multiple users and the notification may be performed to users or recipients whose importance score fulfills the predefined delivery condition. For example, the message may be important for one user and not for others and thus the notification to the other users may be resource wasting as it is not needed. The present method may enable to save computing resources as only users concerned with the message are notified.

In some embodiments, the application of the natural language processing algorithm comprises extracting information from the message indicating a temporal relevance of the message.

In some embodiments, the application of the natural language processing algorithm comprises extracting information from the message indicating whether a user of the messaging system for whom the importance score is calculated is directly addressed by the message.

In some embodiments, the application of the natural language processing algorithm comprises extracting information from the message indicating a sentiment.

In some embodiments, the application of the natural language processing algorithm comprises, in response to identifying a language fragment indicating that an issue or problem has been resolved or that the issue is expired according the timing expressed in the message, updating the importance score such that the importance score corresponds to a lower importance of the message. This means that a request not answered in time (e.g., too late of request/response) may trigger a change of the score to a lower value.

Figure 1:
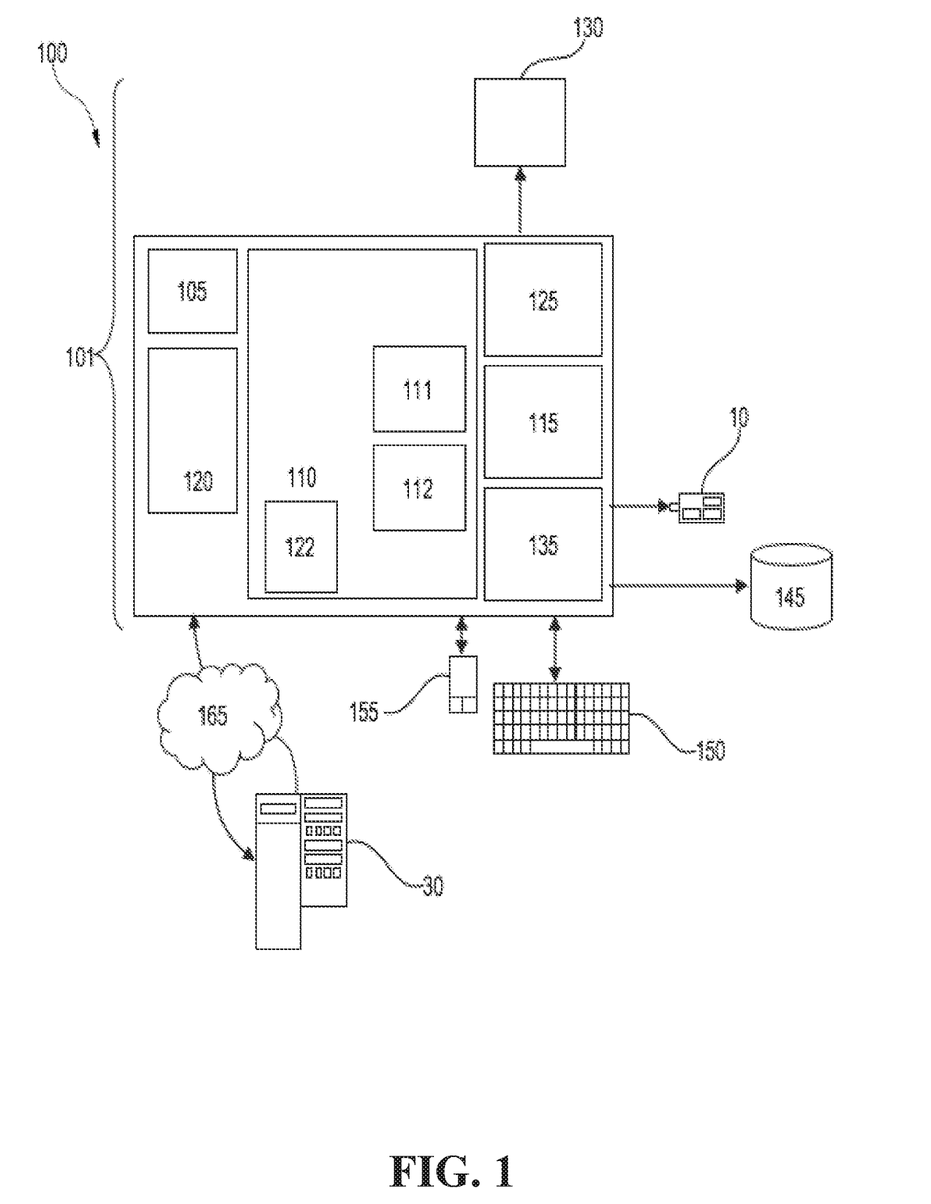
FIG. 1 illustrates a computerized system, in accordance with embodiments of the present disclosure.

Referring now to FIG. 1, illustrated a computerized system 100, in accordance with embodiments of the present disclosure.

It will be appreciated that the methods described herein are at least partly non-interactive, and automated by way of computerized systems, such as servers or embedded systems. In embodiments though, the methods described herein can be implemented in a (partly) interactive system. These methods can further be implemented in software 112, including firmware 122, hardware (processor) 105, or a combination thereof. In embodiments, the methods described herein are implemented in software 112, as an executable program, and are executed by a special or general-purpose digital computer, such as a personal computer, workstation, minicomputer, or mainframe computer. The most general computerized system 100 therefore includes a general-purpose computerized system 101.

In embodiments, in terms of hardware architecture, as shown in FIG. 1, the computerized system 101 includes a processor 105, memory (main memory) 110 coupled to a memory controller 115, and one or more input and/or output (I/O) devices (or peripherals) 10, 145 that are communicatively coupled via a local input/output controller 135. The input/output controller 135 can be, but is not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components. As described herein the I/O devices 10, 145 may generally include any generalized cryptographic card or smart card known in the art.

The processor 105 is a hardware device for executing software, particularly that stored in memory 110. The processor 105 can be any custom made or commercially available processor, a central processing unit (CPU), an auxiliary processor among several processors associated with the computerized system 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM). Note that the memory 110 can have a distributed architecture, where various components are situated remote from one another, but can be accessed by the processor 105.

The software in memory 110 may include one or more separate programs, each of which comprises an ordered listing of executable instructions for implementing logical functions, notably functions involved in embodiments of this disclosure. In the example of FIG. 1, software in the memory 110 includes instructions of/for software 112, e.g., instructions to manage databases such as a database management system.

The software in memory 110 shall also typically include a suitable operating system (OS) 111. The OS 111 essentially controls the execution of other computer programs, such as possibly software 112 for implementing methods as described herein.

The methods described herein may be in the form of a source program of/for software 112, executable program of/for software 112 (object code), script, or any other entity comprising a set of instructions of/for software 112 to be performed. When the methods described herein are source programs, then the programs need to be translated via a compiler, assembler, interpreter, or the like, which may or may not be included within the memory 110, so as to operate properly in connection with the OS 111. Furthermore, the methods can be written as an object oriented programming language, which has classes of data and methods, or a procedure programming language, which has routines, subroutines, and/or functions.

In embodiments, a conventional keyboard 150 and mouse 155 can be coupled to the input/output controller 135. Other output devices such as the I/O devices 145 may include input devices, for example but not limited to a printer, a scanner, microphone, and the like. Finally, the I/O devices 10, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The I/O devices 10, 145 can be any generalized cryptographic card or smart card known in the art. The system 100 can further include a display controller 125 coupled to a display 130. In embodiments, the system 100 can further include a network interface for coupling to a network 165. The network 165 can be an IP-based network for communication between the computerized system 101 and any external server, client and the like via a broadband connection. The network 165 transmits and receives data between the computerized system 101 and external systems 30, which can be involved to perform part or all of the steps of the methods discussed herein. In embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computerized system 101 is a PC, workstation, intelligent device or the like, the software in the memory 110 may further include a basic input output system (BIOS), e.g., firmware 122. The BIOS is a set of essential software routines that initialize and test hardware at startup, start the OS 111, and support the transfer of data among the hardware devices. The BIOS is stored in ROM so that the BIOS can be executed when the computerized system 101 is activated.

When the computerized system 101 is in operation, the processor 105 is configured to execute software 112 stored within the memory 110, to communicate data to and from the memory 110, and to generally control operations of the computerized system 101 pursuant to the software. The methods described herein and the OS 111, in whole or in part, but typically the latter, are read by the processor 105, possibly buffered within the processor 105, and then executed.

When the systems and methods described herein are implemented in software 112, as is shown in FIG. 1, the methods can be stored on any computer readable medium, such as storage 120, for use by or in connection with any computer related system or method. The storage 120 may comprise a disk storage such as HDD storage.

Figure 2:
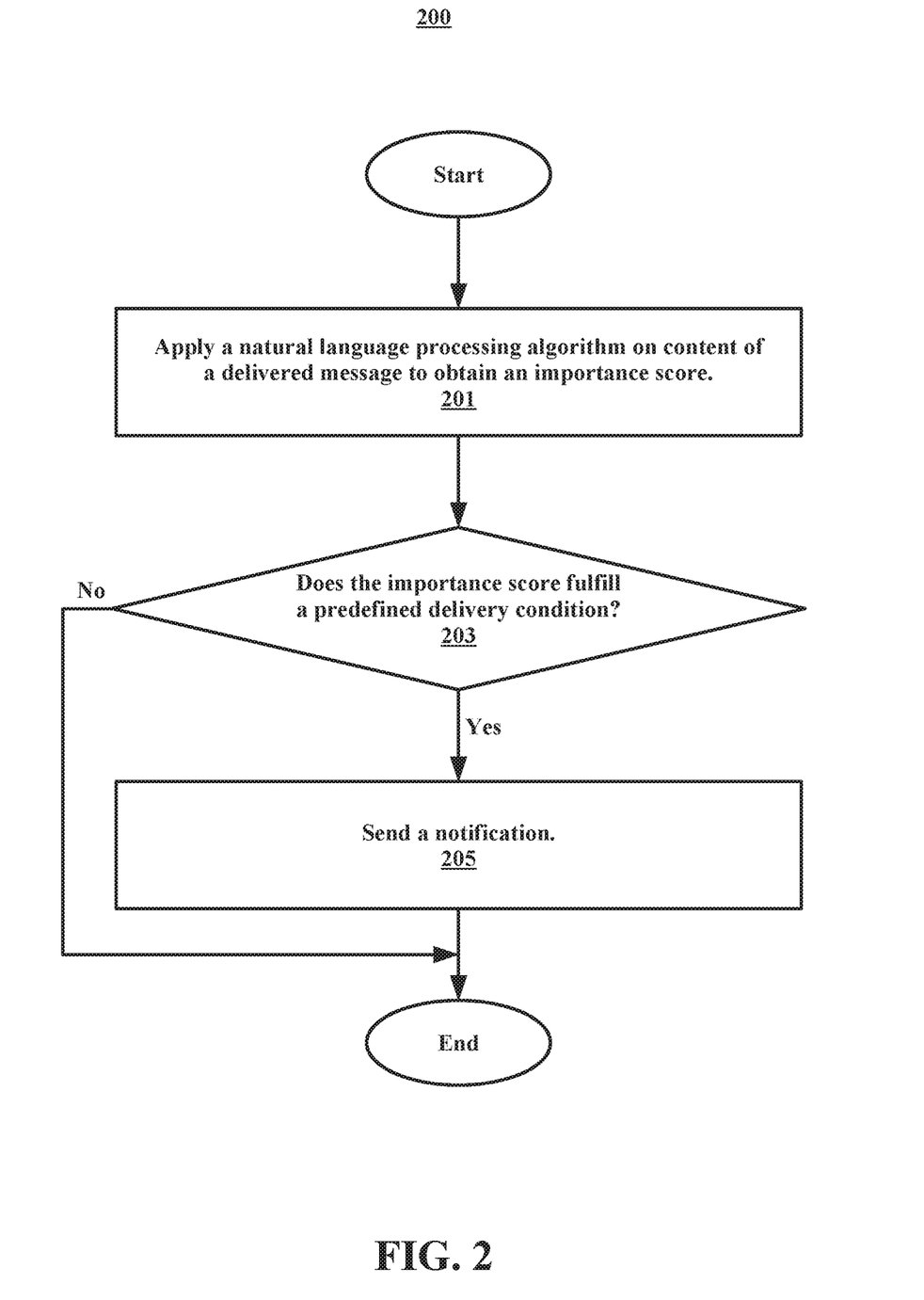
FIG. 2 illustrates a flowchart of a method for processing delivered electronic messages, in accordance with embodiments of the present disclosure.

Referring now to FIG. 2, illustrated is a flowchart of a method 200 for processing delivered electronic messages, in accordance with embodiments of the present disclosure.

In some embodiments, the method 200 begins at operation 201, where a natural language processing algorithm may be applied to content of a delivered message to obtain an importance score.

For example, the message may be delivered to one or more multiple recipients. The message may, for example, be an email or a social media posted content. Social media may refer to a web-site on which one or more users may post content related to social interactions on a web-site with other users. Content generally refers to images, videos, comments or other text, date information, identification data, links, user profiles, or other data or information that may be posted or otherwise accessible on or from the social media site(s).

The delivered message may, or may not, indicate the recipient to whom the message is directly delivered. For example, an email may be sent to a mailing list which contains multiple recipients. In this case, a recipient may directly be addressed by, for example, mentioning that in the content of the email.

The natural language processing (NLP) algorithm may be applied to understand and interpret the natural or human language so that the understood or interpreted text may be used to generate computer instructions and/or data accordingly. For example, the NLP algorithm may be used to interpret content of the delivered message, wherein the interpreted text is used to evaluate predefined message parameters. The message parameters may, for example, comprise the conditions of at least: a time period required for a response to the message, an indication if the recipient is addressed by the message or not and an indication of a positive or negative statement in the message. The evaluated message parameters may be scored. The scoring may be performed by selecting a scoring scheme of predefined scoring schemes and applying the selected scoring scheme on the evaluated message parameters. The scores may then be combined for determining the importance score.

For example, the NLP algorithm may be configured to evaluate the time period required for a response to the delivered message using the following elements of the delivered message referred to as "importance." "temporal relevance" of the message.

The "importance" and the "temporal relevance" elements are used for evaluating the time needed for providing a response by a recipient, as the delivered message could become old very quickly if the recipient does not respond promptly and a notification (operation 205) could not be necessary anymore. Otherwise if the message is still valid in terms of "timing" the notification can be triggered. The temporal importance corresponds to an expiration time or time period by which a response should be provided; after this time, the response may be less useful.

The "importance" element may indicate whether the message requires a prompt response or action. This may indicate that the recipient should be prompted for attention of the delivered message. For example, if the delivered message comprises the following text "Please give an immediate/asap response," this indicates that the recipient needs to respond to the delivered message within a predefined time period, e.g., of 1 hour. In another example, if the delivered message comprises the following text "Can you buy the bread when you came back home?" this indicates that the recipient should be notified when he leaves the office; or this indicates a response to the delivered message is to be performed within a time period, e.g., of 6 hours. In another example, if the delivered message comprises the following text "Dad, do not forget the wedding anniversary tomorrow, buy flowers for mom," this indicates that the recipient should know the date by which he should buy the flowers as a response to the message.

For the "temporal relevance" element, the delivered message may, for example, comprise the following text "See you in 10 minutes," which indicates that the recipient could not be notified anymore if 1 hour is elapsed.

The NLP algorithm may be configured to evaluate a parameter that indicates if the recipient is addressed (or directly addressed) by the delivered message or not. For example, a message in a multi-chat context requires that a specific user whom the message is directed to, e.g., when the delivered message is specifically tagged with the @recipient convention (e.g., the delivered message comprises: "@recipient do you want to join to the party tonight?") a notification can be directed to the specific recipient as the message indicates that the recipient is directly addressed.

In another example, if in the multi-chat context that involves multiple recipients, the specific @recipient is missing, it is necessary to understand the "term complement" from the sentences. This may indicate that the specific @recipient is directly concerned to provide a response. Thus, when a recipient is in the discussion and, he or she, does not provide a message response, a notification would be triggered for/to him/her.

In another example, the NLP algorithm may evaluate a parameter based on a "sentiment" element that indicates if there is a negative or positive statement. A "sentiment" refers to an attitude, opinion, or judgment of a user with respect to a subject. The NLP algorithm may be configured to perform a sentiment analysis (or opinion mining) to identify and extract subjective information in source data. Sentiment analysis aims to determine the attitude of a speaker or a writer (e.g., a user) with respect to some topic or the overall contextual polarity of a document. The attitude may be his or her judgment or evaluation, the emotional state of the author when writing, or the emotional effect the author wishes to have on the reader.

If the delivered message has content with negative sentiments, a notification could be necessary depending on the context. For example, if the delivered message comprises the following text "I've been struggling for two days on this . . . ," the parameter may be evaluated to indicate that there is a negative sentiment and a response from the recipient may be needed.

The importance score may be determined by evaluating at least one of the message parameters. For example, if a first parameter indicates the time needed to provide a response, the importance score may be evaluated such that its value is inversely proportional to the time left for the recipient to provide a response. If, in addition, another second parameter indicates that there is a negative sentiment, the determined importance score may be increased such that the response is to be provided even before the time defined in the first parameters. Another example of evaluating the importance score may be performed using score rules described below.

In some embodiments, after operation 201, the method 200 proceeds to decision block 203. At decision block 203, if the importance score does not fulfill a predefined delivery condition, the method 200 ends. If at decision block 203, the importance score does fulfill a predefined delivery condition, the method 200 proceeds to operation 205. At operation 205, a notification may be sent to at least one recipient of the delivered message.

The notification may be used as a reminder of the delivered message, e.g., reminding the at least one recipient, that a response to the message may be needed. The predefined condition may, for example, require that the importance score is higher than a predefined threshold. The predefined condition may further require that the user did not respond yet to the delivered message. If the importance score does not fulfill the delivery condition (e.g., because the recipient has responded) the notification would not be sent.

In some embodiments, the notification may be in the form of an additional message (e.g., a reminder email or chat message). In some embodiments, the notification may be an alert that is generated by the communications application (e.g., a pop-up alert generated by an email client or instant messaging application). The form of the notification may be dependent upon the importance or urgency of the message for which the notification is generated. For example, if the message is of low importance, or if the user has plenty of time to respond, the notification may be an email. However, if the message is highly important or an immediate response is needed, the notification may be a pop-up notification.

Steps 201-205 may be repeatedly performed on a regular basis, e.g., every hour, minute, etc. This enables that the status of the delivered message and its context to be monitored frequently and the notification to be repeated until the user has finally decided to respond or not to respond (e.g., the user may have the option to ignore the notifications by pressing an ignore button, or shutting the notifications off, etc.).

In one example, steps 203-205 may be optional. In another example, the delivered message may be flagged or associated with the determined important score such that the recipient can respond, or read, or not read the delivered message based on the associated importance score.

In some embodiments, the score rules may be determined as in the following example:

Each recipient involved in a discussion may be assigned an importance score. A higher value for the recipient may mean that the recipient should take care of the discussion, by reading the past messages and eventually answering to the thread.

When a message is directed to all the users of the discussion then a score of +5 points is assigned to all users.

When the request on the discussion is directed to a specific user or a subset of users, the score of this user is increased to a specific value (+30 points).

The score becomes higher when an important content is identified on the discussion (+10 points).

The score is incremented if there is also a time limit to answer before the request becomes invalid (+60 points).

When an answer is provided by some user of the thread, then scores of the recipients that have not yet answered are decreased (−10 points).

When a final sentence is written stating that the thread can be closed, then all scores for all recipients are set to zero and nobody will be notified anymore to provide his contribution to the discussion.

It should be understood that the above example is provided for illustrative purposes, and that the criteria and associated scores are not be construed as limiting. Additional criteria, fewer criteria, different scores, and different combinations that fall within the spirit and scope of the present disclosure are contemplated.

Figure 3:
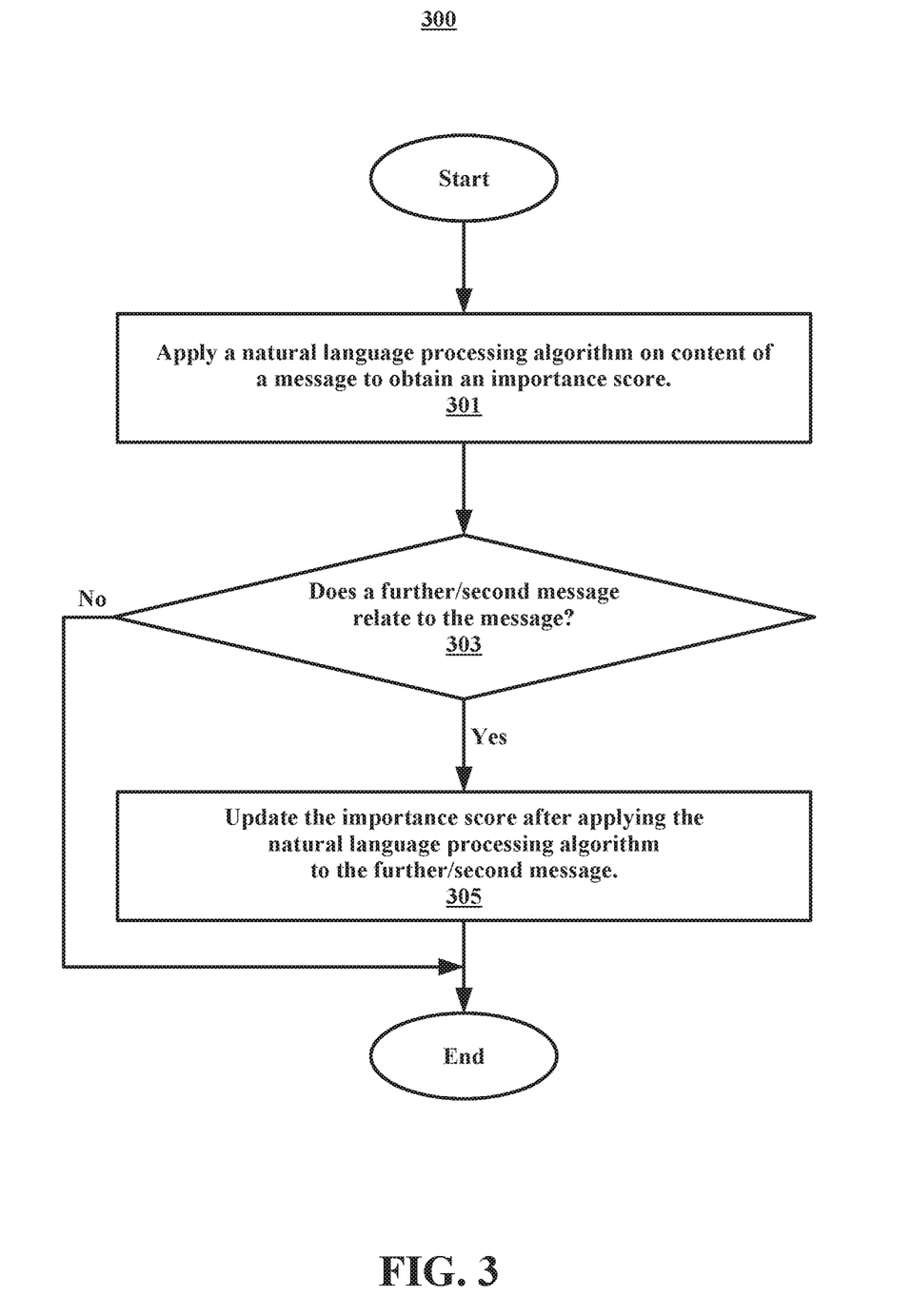
FIG. 3 illustrates a flowchart of a method for calculating an importance score of a message submitted to an electronic messaging system, in accordance with embodiments of the present disclosure.

Referring now to FIG. 3, illustrated is a flowchart of a method 300 for calculating an importance score of a message submitted to an electronic messaging system, in accordance with embodiments of the present disclosure. In some embodiments, the method 300 begins at operation 301 where a natural language processing algorithm is applied to/on content of a message to obtain an importance score. After operation 301, the method 300 proceeds to decision box 303. In some embodiments, upon appearance of a further delivered message submitted to the messaging system, it may be determined at decision block 303 if the further delivered message is related to the message and, if the further delivered message is not related to the message, the method 300 ends.

If however, the further delivered message is related to the message, the method 300 proceeds to operation 305, where the importance score may be updated based on applying the natural language processing algorithm to the further delivered message. The electronic messaging system may, for example, be the computerized system 100 of FIG. 1. The user may, for example, use the updated importance score to decide to respond or not to the message and/or further delivered message. The updating of the importance score may further comprise assigning an importance score to the further delivered message. This may, for example, be advantageous in case the two messages belong to different threads.

In some embodiments, the operations performed by decision block 303 may automatically be performed and repeated for each of the message and the further delivered message upon receiving further delivered messages of the message and the further delivered message respectively. A notification may, for example, be performed for the message and the further delivered message if the respective score fulfills the delivery condition. That is, each prior message may have an importance score update to following the delivery of a further delivered message, thus showing which message(s) within the thread specifically need to be responded to.

In another example, a method and system may be configured to perform the following steps: reading messages being exchanged in a messaging platform (the messages have already been delivered to the recipients (users)); analyzing the content and identifying the importance of the messages above, and prioritizing them dynamically, e.g., by changing or updating the scores of a message based on corresponding further delivered messages. The priority may not be assigned in a fixed way, but it can change along the thread/chat discussion, so it is updated in real time with a scoring scheme (e.g., as described above). The method further comprises identifying the subset of messages (on a multiuser discussion) that has been addressed to a specific person, but the person has not already read them or have not replied to the discussion; calculating a score per recipient; and sending a notification to the recipients with a score higher than a predefined score threshold to take care of the discussions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
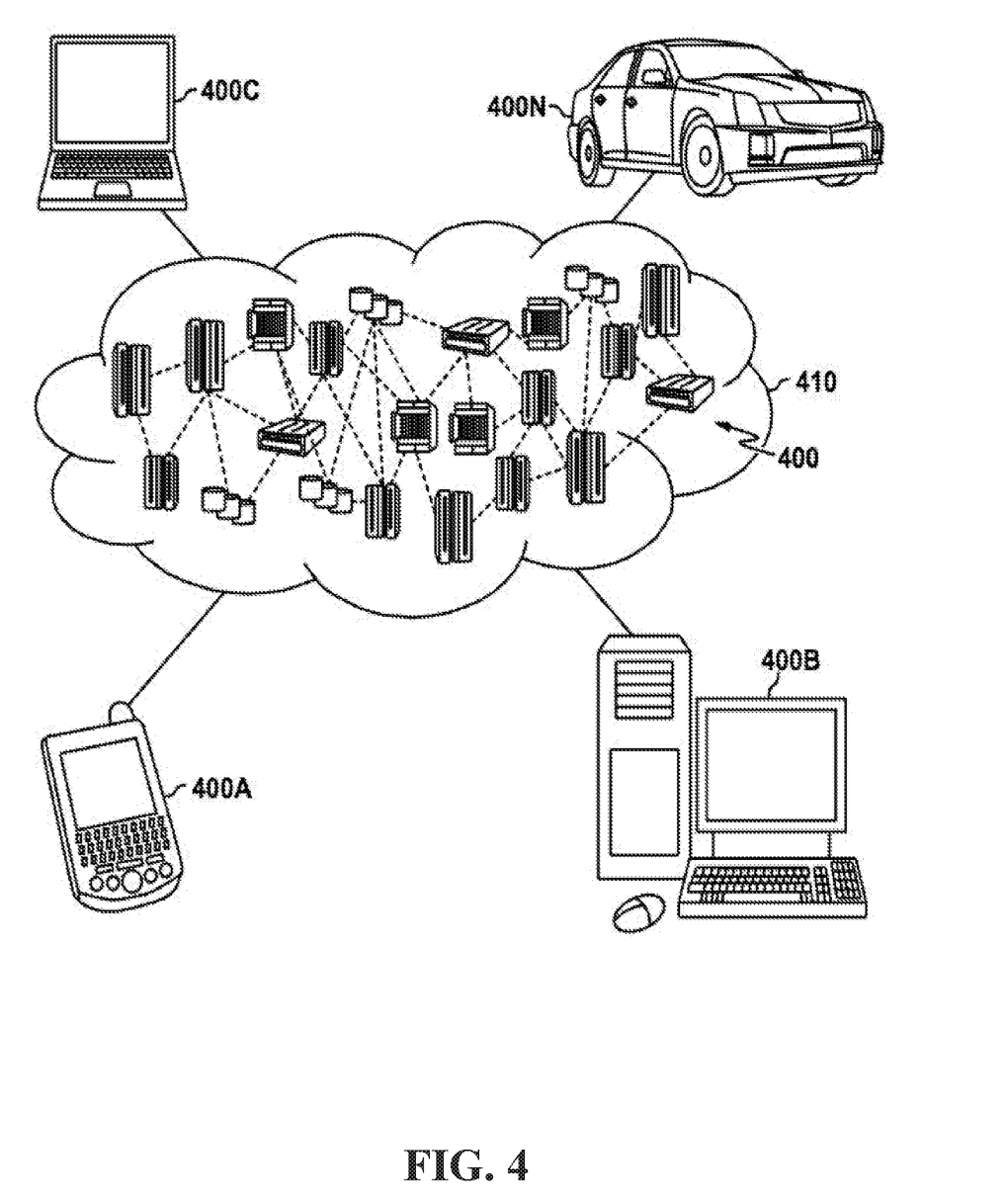
FIG. 4 depicts a cloud computing environment, in accordance with embodiments of the present disclosure.

Referring now to FIG. 4, illustrative cloud computing environment 410 is depicted. As shown, cloud computing environment 410 includes one or more cloud computing nodes 400 with which local computing devices used by cloud consumers, such as, for example, personal digital assistant (PDA) or cellular telephone 400A, desktop computer 400B, laptop computer 400C, and/or automobile computer system 400N may communicate. Nodes 400 may communicate with one another. They may be grouped (not shown) physically or virtually, in one or more networks, such as Private, Community, Public, or Hybrid clouds as described hereinabove, or a combination thereof.

This allows cloud computing environment 410 to offer infrastructure, platforms and/or software as services for which a cloud consumer does not need to maintain resources on a local computing device. It is understood that the types of computing devices 400A-N shown in FIG. 4 are intended to be illustrative only and that computing nodes 400 and cloud computing environment 410 can communicate with any type of computerized device over any type of network and/or network addressable connection (e.g., using a web browser).

Figure 5:
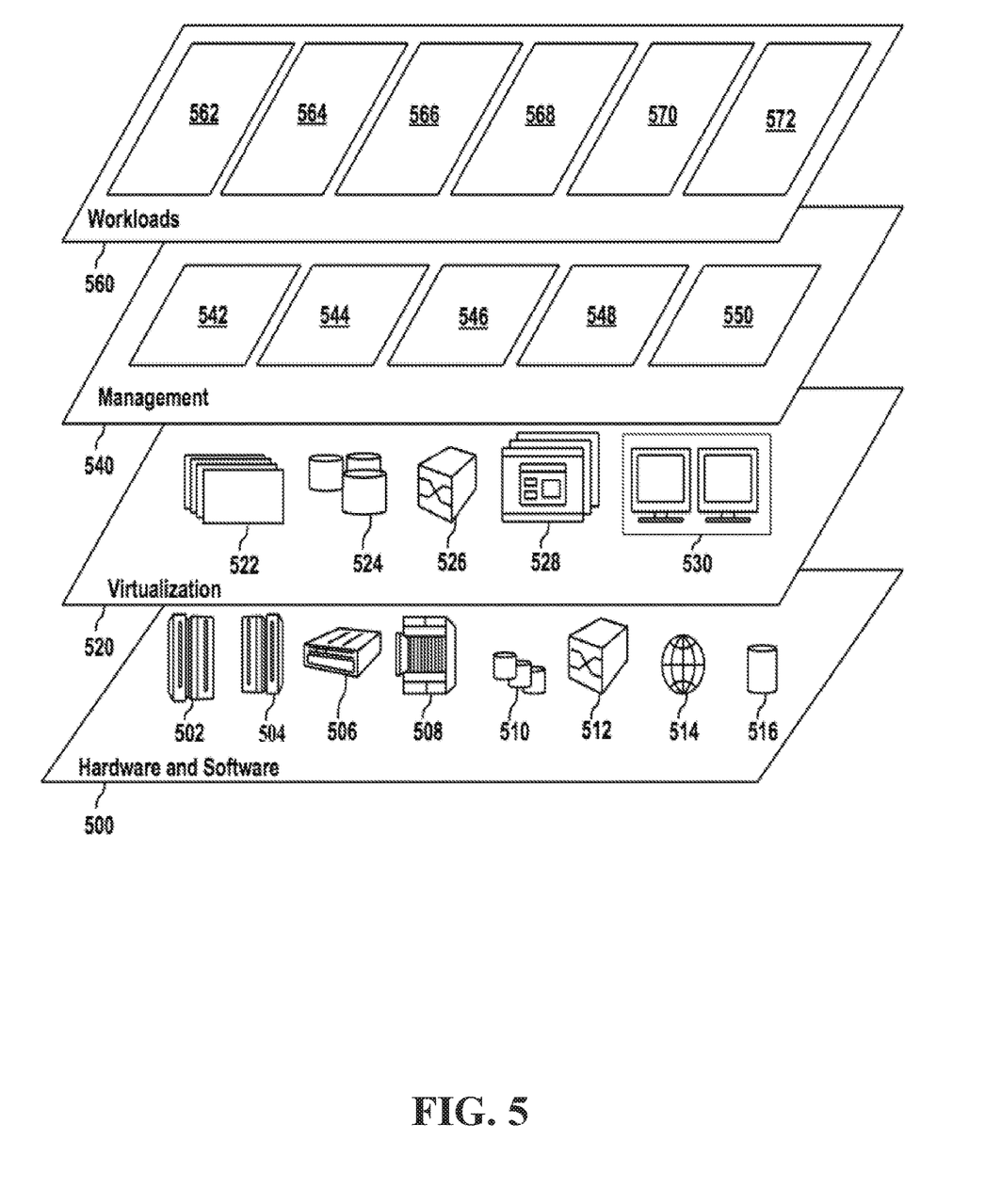
FIG. 5 depicts abstraction model layers of a cloud computing environment, in accordance with embodiments of the present disclosure.

Referring now to FIG. 5, a set of functional abstraction layers provided by cloud computing environment 410 (FIG. 4) is shown. It should be understood in advance that the components, layers, and functions shown in FIG. 5 are intended to be illustrative only and embodiments of the invention are not limited thereto. As depicted below, the following layers and corresponding functions are provided.

Hardware and software layer 500 includes hardware and software components. Examples of hardware components include: mainframes 502; RISC (Reduced Instruction Set Computer) architecture based servers 504; servers 506; blade servers 508; storage devices 510; and networks and networking components 512. In some embodiments, software components include network application server software 514 and database software 516.

Virtualization layer 520 provides an abstraction layer from which the following examples of virtual entities may be provided: virtual servers 522; virtual storage 524; virtual networks 526, including virtual private networks; virtual applications and operating systems 528; and virtual clients 530.

In one example, management layer 540 may provide the functions described below. Resource provisioning 542 provides dynamic procurement of computing resources and other resources that are utilized to perform tasks within the cloud computing environment. Metering and Pricing 544 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 546 provides access to the cloud computing environment for consumers and system administrators. Service level management 548 provides cloud computing resource allocation and management such that required service levels are met. Service Level Agreement (SLA) planning and fulfillment 550 provide pre-arrangement for, and procurement of, cloud computing resources for which a future requirement is anticipated in accordance with an SLA.

Workloads layer 560 provides examples of functionality for which the cloud computing environment may be utilized. Examples of workloads and functions which may be provided from this layer include: mapping and navigation 562; software development and lifecycle management 564; virtual classroom education delivery 566; data analytics processing 568; transaction processing 570; and importance determination scoring processing 572.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A computer implemented method of processing delivered electronic messages, the method comprising:
    receiving, by a processor, a delivered message;
    identifying, using natural language processing, content of the delivered message;
    generating, based on the content of the delivered message, a first importance score for the delivered message, respectively, for each of two or more recipients of the delivered message, wherein the first importance score is based on a temporal relevance respectively associated with each of the two or more recipients;
    sending, in response to the first importance score fulfilling a predefined delivery condition, a notification to at least one recipient of the delivered message, wherein a form of the notification is generated based on the first importance score as it relates to the temporal relevance;
    receiving a second delivered message, where the second delivered message is submitted to the at least one recipient;

determining that the second delivered message is related to the delivered message, wherein determining that the second delivered message is related to the delivered message is based on identifying content of the second delivered message; and updating, in response to determining the relation between the delivered message and the second delivered message, the first importance score of the delivered message, wherein the updating of the first importance score changes the temporal relevance and the form of the notification.

2. The method of claim 1, wherein determining that the second delivered message is related to the delivered message comprises:

comparing metadata of the delivered message to metadata of the second delivered message, wherein the metadata of the delivered message and the metadata of the second delivered message indicate that the delivered message and the second delivered message belong to a specific thread of messages.

3. The method of claim 1, wherein the predefined condition to send the notification is identifying that the recipient did not respond to the delivered message.

4. The method of claim 1, wherein generating the first importance score comprises:

identifying one or more predefined message parameters;
assigning a respective weight to each of the predefined message parameters; and
combining the respective weights.

5. The method of claim 4, further comprising:

selecting a scoring model for determining the first importance score, wherein the scoring model is selected based on the time of applying the natural language processing; and
applying the selected scoring model.

6. The method of claim 4, wherein the one or more message parameters include a time period required for a response to the delivered message, an indication that the recipient is addressed in the delivered message, and an indication of a connotative statement in the delivered message.

7. The method of claim 1, wherein the predefined delivery condition includes a condition that the first importance score is updated at least once and a condition that the first importance score exceeds a predefined importance threshold.

8. The method of claim 1, wherein the delivered message is delivered to two or more users including the recipient, wherein the first importance score is user-dependent.

9. The method of claim 1, wherein identifying the content of the delivered message comprises:

extracting information from the delivered message that indicates the temporal relevance of the delivered message.

10. The method of claim 1, wherein identifying the content of the delivered message comprises:

extracting information from the delivered message that indicates that a user is directly addressed in the delivered message.

11. The method of claim 1, wherein identifying the content of the delivered message comprises:

extracting information from the delivered message that indicates a sentiment towards a user.

12. The method of claim 1, wherein identifying the content of the delivered message comprises:

identifying a language fragment indicating that an issue has been resolved; and updating the first importance score by lowering the first importance of the delivered message.

13. An electronic messaging system comprising:

a memory; and a processor in communication with the memory, the processor being configured to perform operations comprising:

receiving a message;

identifying, using natural language processing, content of the message;

generating, based on the content of the message, a first importance score for the message, respectively, for each of two or more recipients of the delivered message, wherein the first importance score is based on a temporal relevance respectively associated with each of the two or more recipients;

sending, in response to the first importance score fulfilling a predefined delivery condition, a notification to at least one recipient of the delivered message, wherein a form of the notification is generated based on the first importance score as it relates to the temporal relevance;

receiving a second delivered message, where the second delivered message is submitted to the at least one recipient;

determining that a second message received is related to the message, wherein determining that the second message is related to the message is based on identifying content of the second message; and updating, in response to determining the relation between the delivered message and the second message, the first importance score, wherein the updating of the first importance score changes the temporal relevance and the form of the notification.

14. The system of claim 13, wherein determining that the second message received is related to the message comprises:

comparing metadata of the delivered message to metadata of the second delivered message, wherein the metadata of the delivered message and the metadata of the second delivered message indicates that the delivered message and the second delivered message belong to a specific thread of messages.

15. The system of claim 13, wherein identifying the content of the delivered message comprises:

extracting information from the delivered message that indicates the temporal relevance of the delivered message.

16. The system of claim 13, wherein identifying the content of the delivered message comprises:

extracting information from the delivered message that indicates that a user is directly addressed in the delivered message.

17. The system of claim 13, wherein identifying the content of the delivered message comprises:

extracting information from the delivered message that indicates a sentiment towards a user.

18. The system of claim 13, wherein identifying the content of the delivered message comprises:

identifying a language fragment indicating that an issue is expired according a timing expressed in the message; and updating the first importance score by lowering the first importance of the delivered message.

19. A computer program product comprising a computer readable storage medium having program instructions embodied therewith, the program instructions executable by a processor to cause the processor to perform a method, the method comprising:

receiving, by a processor, a delivered message;

identifying, using natural language processing, content of the delivered message;

generating, based on the content of the delivered message, a first importance score for the delivered message, respectively, for each of two or more recipients of the delivered message; wherein the first importance score is based on a temporal relevance respectively associated with each of the two or more recipients; and sending, in response to the first importance score fulfilling a predefined delivery condition, a notification to at least one recipient of the delivered message, wherein a form of the notification is generated based on the first importance score as it relates to the temporal relevance;

receiving a second delivered message, where the second delivered message is submitted to the at least one recipient;

determining that the second delivered message is related to the delivered message, wherein determining that the second delivered message is related to the delivered message is based on identifying content of the second delivered message; and updating, in response to determining the relation between the delivered message and the second delivered message, the first importance score of the delivered message, wherein the updating of the first importance score changes the temporal relevance and the form of the notification.

\* \* \* \* \*